Patented Feb. 9, 1954

2,668,837

UNITED STATES PATENT OFFICE 2,668,837

BIS(O - ETHYL DIMETHYLAMIDOPHOS-PHORIC) DIMETHYLAMIDOPHOS-PHORIC DIANHYDRIDE

Henry Tolkmith, Midland, Mich., assignor to The Dow Chemical Company, Midland, Mich., a corporation of Delaware No Drawing. Application January 29, 1953, Serial No. 334,073

1 Claim. (Cl. 260—461)

The present invention is directed to bis(O-ethyl dimethylamidophosphoric) dimethylamidophosphoric dianhydride of the formula

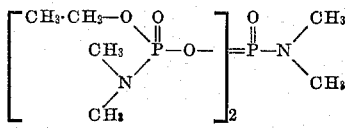

This compound is an oily liquid somewhat soluble in many organic solvents and water. It is valuable as an intermediate for the preparation of more complex phosphorus derivatives and as a toxic constituent of parasiticide compositions.

The new compound may be prepared by reacting 1 molecular proportion of dimethylamidophosphoric dichloride of the formula

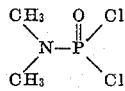

with at least 2 molecular proportions of O,O-diethyl dimethyl amidophosphate of the formula

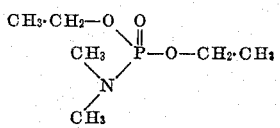

The reaction involves a condensation resulting in the formation of ethyl chloride. In practice, substantially all the chlorine in the dimethylamidophosphoric dichloride may be recovered as ethyl chloride. The reaction takes place smoothly at the temperature range of from 90° to 135° C., and at a rate which varies directly with the employed temperature. Since the desired products have a tendency to rearrange into other materials at temperatures in excess of 135° C., such elevated reaction temperatures should not be employed for any appreciable period of time. If desired, the reaction may be carried out in an inert organic solvent such as toluene and xylene.

In carrying out the reaction, the dimethylamidophosphoric dichloride and O,O-diethyl dimethylamidophosphate are mixed together and the resulting dispersion heated at a temperature of from 90° to 135° C. until the evolution of ethyl chloride of reaction is substantially complete. Upon completion of the reaction, the mixture may be distilled under reduced pressure and under 135° C. to separate low boiling constituents and to obtain as a residue the desired bis(O-ethyl dimethylamidophosphoric) dimethylamidophosphoric dianhydride.

In a representative operation, 14.4 grams (0.89 mole) of dimethylamidophosphoric dichloride and 32.4 grams (0.179 mole) of O,O-diethyl dimethylamidophosphate were mixed together and the resulting dispersion heated at a temperature of from 125° to 130° C. until the evolution of ethyl chloride of reaction was substantially complete. The heating was carried out with stirring and over a period of about 3 hours. During the heating, ethyl chloride was separated and recovered from the reaction zone as formed. As a result of these operations, a bis(O-ethyl dimethylamidophosphoric) dimethylamidophosphoric dianhydride product was obtained in substantially quantitative yield as an oily liquid having a density of 1.2141 and a refractive index $n/D$ of 1.4471 at 20° C.

The O,O-diethyl dimethylamidophosphate employed as a starting material, as previously described, is an oily liquid having a density of 1.0485 and a refractive index $n/D$ of 1.4230 at 20° C. This compound may be prepared by reacting 1 molecular proportion of dimethylamidophosphoric dichloride with 2 molecular proportions of sodium ethylate. The reaction is somewhat exothermic and takes place readily at temperatures of from 30° to 80° C. The temperature may be controlled by regulating the rate of contacting the reactants, as well as by the addition and subtraction of heat, if required. Upon completion of the reaction, the mixture may be filtered and the filtrate fractionally distilled under reduced pressure to separate the desired product.

The new bis(O-ethyl dimethylamidophosphoric) dimethylamidophosphoric dianhydride product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In representative operations against two-spotted spider mites, bean aphids and Mexican bean beetles, 100 percent kills of these pests were obtained with aqueous spray compositions containing 0.5 pound of the toxic dianhydride per 100 gallons of spray mixture.

This is a continuation-in-part of my copending application Serial No. 242,409, filed August 17, 1951.

I claim:

Bis(O-ethyl dimethylamidophosphoric) dimethylamidophosphoric dianhydride.

HENRY TOLKMITH.

No references cited.